(12) United States Patent
Mikijelj et al.

(10) Patent No.: US 7,989,380 B2
(45) Date of Patent: Aug. 2, 2011

(54) HIGH RESISTIVITY SIC MATERIAL WITH B, N AND O AS THE ONLY ADDITIONS

(75) Inventors: Biljana Mikijelj, Cerritos, CA (US);
Shanghua Wu, Irvine, CA (US)

(73) Assignee: Ceradyne, Inc., Costa Mesa, CA (US)

( * ) Notice: Subject to any disclaimer, the term of this patent is extended or adjusted under 35 U.S.C. 154(b) by 114 days.

(21) Appl. No.: 12/315,056

(22) Filed: Nov. 26, 2008

(65) Prior Publication Data

US 2010/0130344 A1     May 27, 2010

(51) Int. Cl.
*C04B 35/575*     (2006.01)
*C04B 35/565*     (2006.01)
(52) U.S. Cl. ............................. 501/91; 501/92
(58) Field of Classification Search ............ 501/91, 501/92
See application file for complete search history.

(56) References Cited

U.S. PATENT DOCUMENTS

| | | |
|---|---|---|
| 3,960,577 A | 6/1976 | Prochazka |
| 4,135,938 A | 1/1979 | Murata et al. |
| 4,701,427 A | 10/1987 | Boecker et al. |
| 4,762,810 A | 8/1988 | Endo et al. |
| 5,011,639 A | 4/1991 | Urasato et al. |
| 6,090,733 A * | 7/2000 | Otsuki et al. ............ 501/90 |
| 6,214,755 B1 * | 4/2001 | Otsuki et al. ............ 501/90 |
| 6,531,423 B1 | 3/2003 | Schwetz et al. |

FOREIGN PATENT DOCUMENTS

| | | |
|---|---|---|
| CA | 1256459 | 6/1989 |
| JP | 1985 0290454 | 7/1987 |
| JP | 1986 0006394 | 7/1987 |
| JP | 1986 1100421 | 11/1987 |
| JP | 1999 11-310817 | 5/2001 |
| JP | 2001 352223 | 11/2001 |
| JP | 2002 078977 | 2/2003 |
| JP | 2003 358764 | 10/2003 |
| JP | 2005 057149 | 9/2006 |
| JP | 2006240909 | * 9/2006 |

OTHER PUBLICATIONS

Hot-Pressed SiC Ceramics by K. Nakamura & K. Maeda, Silicon Carbide Ceramics-2, Gas Phase Reactions, Fibers and Whisker, Joining, Elsevier Applied Science (1991) pp. 139-162.

* cited by examiner

*Primary Examiner* — Karl E Group
(74) *Attorney, Agent, or Firm* — Leonard Tachner

(57) ABSTRACT

A dense silicon carbide (SiC) material with boron (B), nitrogen (N) and oxygen (O) as the only additives and with excellent insulating performance (electrical volume resistivity greater than $1\times10^8$ $\Omega\cdot$cm). The SiC ceramic material, made from a powder mix of, by weight, from 0.1 to 7% boron carbide, from 0.1 to 7% silicon nitride, from 0.1 to 6% silicon dioxide, and a balance of $\alpha$-SiC, consists essentially of (1) at least 90% by weight of $\alpha$-SiC, (2) about 0.3 to 4.0% by weight of boron, (3) about 0.1 to 6.0% by weight of nitrogen, (4) about 0.06 to 0.5% by weight of oxygen, and (5) no more than 0.07% by weight of metallic impurities; wherein the boron and nitrogen are present according to an B/N atomic ratio of 0.9 to 1.5. In particular, this material is suitable for applications in plasma etching chambers for semiconductor and integrated circuit manufacturing.

14 Claims, 1 Drawing Sheet

HIGH RESISTIVITY SiC MATERIAL WITH B, N AND O AS THE ONLY ADDITIONS

BACKGROUND OF THE INVENTION

1. Field of the Invention

Figure 1:
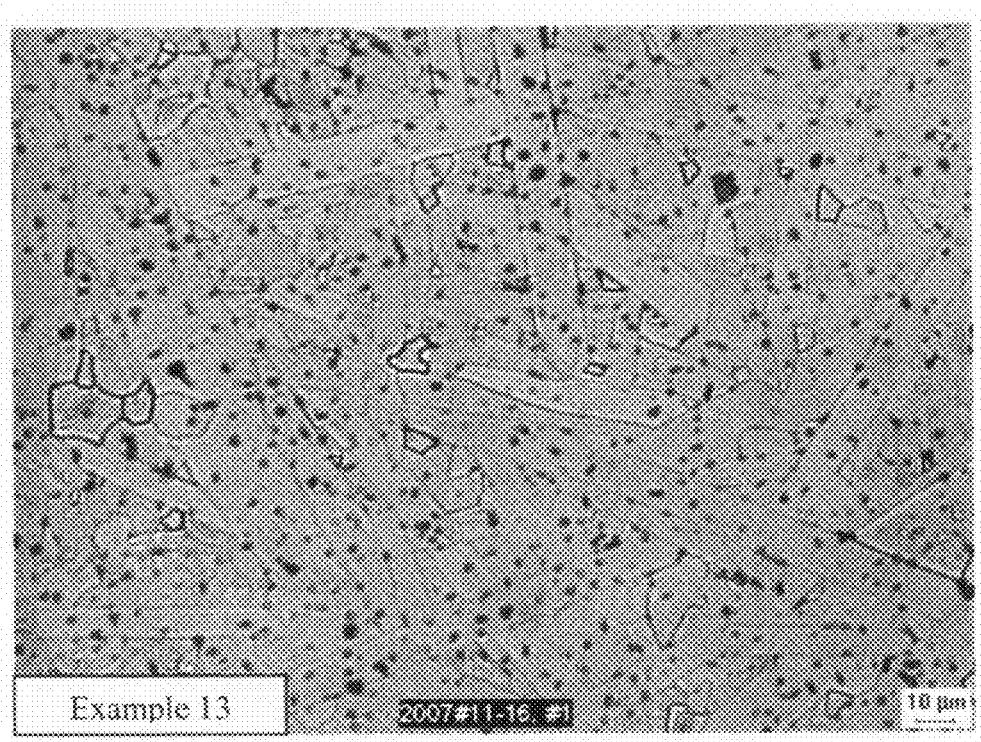

The present invention relates to the field of ceramic materials. More specifically, this invention relates to a dense silicon carbide material having a density close to theoretical and an extremely high electrical resistivity making it especially suitable for use in plasma etching chamber applications.

2. Background Art

SiC ceramics are exceptional structural materials with high hardness, chemical and mechanical wear resistance, low thermal expansion coefficient, high thermal conductivity and good mechanical properties. However, SiC is a semiconductor and in most cases its electrical resistivity is lower than about $1\times10^7$ $\Omega\cdot$cm, preventing its use as an electrical insulator, e.g., a substrate for integrated circuits or an electrostatic chuck or as other components in dielectric etching chambers. In addition to the desirable properties listed above, for most semiconductor etching chamber applications, the purity of the material especially with respect to all metallic impurities has to be as high as possible. This is difficult to achieve in most cases where α-SiC is required as a starting powder, as it is made using the Acheson process and typically not very pure.

High resistivity SiC materials would have a broad applicability in many areas where electrical insulation is required. The advantage of SiC compared to other ceramics is that it has good thermal conductivity, low thermal expansion coefficient and good mechanical strength. For applications in Si wafer etching chambers, in addition to these properties, the material also needs to have very low etching rates in corrosive atmospheres containing F, Cl and other etching gas combinations that form plasmas and electromagnetic fields during operation. The material also needs to have very high purity towards most metals so that they do not contaminate the etched wafer surface during the process. In addition, the material should not have free carbon as a separate phase in the microstructure, as this causes particle generation on the wafer surfaces.

It is well known that Be containing compounds are very powerful sintering aids for SiC densification, and that sintering or hot pressing with their additions also provides a high resistivity SiC material by controlling the n- and p-type charge carrier populations in the material (over $1\times10^9$ $\Omega\cdot$cm, page 145, Silicon Carbide Ceramics-2, ed. S. Somiya, Elzvier 1991). Unfortunately, Be containing powders which are required for the production of these materials can cause Chronic Beryllium Disease (CBD) and are therefore not commercially available. In addition, such materials contain Be in amounts not desirable in etching chamber applications.

Another approach to electrically insulating SiC materials is by providing an electrically insulating oxide based grain boundary layer between the SiC grains. U.S. Pat. No. 6,531,423 patent (Schwetz) is one example where a Yttrium Aluminum garnet phase at triple points and Y—Al—Si—O glassy grain boundary phase surrounding SiC grains provides a material with electrical resistivity of $>1\times10^7$ $\Omega\cdot$cm. Canadian Patent No. 1,256,459 teaches a similar material with additions of $Al_2O_3$ or MgO, in addition to free carbon, yielding resistivities of over $1\times10^9$ $\Omega\cdot$cm. Although such materials have a high resistivity, the Al, Mg and Y (and other common sintering aids) additive levels in them are too high.

A third group of insulating SiC materials are based on having a Boron (elemental or as a compound) as one of the additives, which typically provide a directly bonded SiC material, without a distinct grain boundary phase.

U.S. Pat. No. 4,701,427 teaches a dense, high resistivity SiC obtained by pressureless sintering of formed bodies in a nitrogen containing atmosphere (at over 2250° C.) of predominantly α-SiC powders. Additions to the SiC powder include 0.4-2.0% $B_4C$ and free carbon (additions of which are required up to 2.5%) either as carbon or as a temporary binder which will yield amorphous carbon on decomposition.

Japanese Patent Application No. Japanese Patent Application No. 2002-078977 (Publication No. 2003-277152) (Sumitomo Metal) teaches a dense SiC material with 0.5-4% free carbon (from organic precursors) and 1-20% BN additions that is hot pressed and has a resistivity of over $1\times10^8$ $\Omega\cdot$cm.

Japanese Patent Application No. 2005-057149 (Publication No. 2006-240909) (Sumitomo Osaka) teaches a dense SiC material made by pressureless sintering in a inert atmosphere of SiC powders with additions of 0.5-8% free carbon, 0.1-4 wt % boron additions (as boron or its compounds) and 0.1-4.0 wt % $Si_3N_4$ additions. The material has resistivities above $1\times10^6$ $\Omega\cdot$cm.

Japanese Patent Application No. 2003-358764 (Publication No. 2005-119925) similarly teaches a dense SiC pressureless sintered material made by adding 0.5-10% free carbon and 0.2-4 wt % $B_4C$ or BN powders to the starting SiC powder. This SiC material is disclosed to have resistivities higher than $1\times10^7$ $\Omega\cdot$cm if it has 650-8000 ppm of nitrogen content.

Japanese Patent Application No. 2005-057149 (Publication No. 2006-240960) (Toshiba Ceramics) teaches high resistivity SiC ceramic ($>1\times10^8$ $\Omega\cdot$cm) made by pressureless sintering of α-SiC powder with additions of 0.7-1.0 wt % BN powder and 0.5-4 wt % free carbon (or organic precursor resulting in latter). The resulting material has to have 0.4-0.5% nitrogen content to obtain claimed high resistivity.

Japanese Patent Application Nos. 1986-0006394 (Publication No. 62167253) and 1985-0290454 (Publication No. 62153167), both Showa Denko KK, disclose a SiC material with resistivity, respectively $>10^5$ $\Omega\cdot$cm or $>1\times10^4$ $\Omega\cdot$cm, both of which contain 0.5-3.0 wt % free carbon in addition to B, Al and less than 300 ppm of nitrogen in the densified ceramic.

All of the materials disclosed above have in common that additions of free carbon (either as a powder or an organic precursor) had to be made to the starting SiC powder. Although the addition of carbon helps the densification, the residual free carbon, present as inclusions of varying sizes in the finished part, is detrimental to the performance: it impairs the insulating property and mechanical behavior of the sintered part; it is believed that it also degrades the erosion/corrosion resistance when used in plasma environment and leads to increased contamination. Therefore, there is a need to develop processing and composition that does not use carbon as additive and contains no residual free carbon in the finished parts.

Japanese Patent Application No. 2001-352223 (Publication No. 2003-146758) (Sumitomo Cement) teaches a SiC sintered material that contains less than 100 ppm of free carbon and less than 1000 ppm of all elements (measured by ICP) other than Si and C. The material is made by adding 1-10% BN powder to the SiC powder, hot pressing the material to about 90% of theoretical density, followed by surface machining and a heat treatment in Argon that is claimed to purify the material. Open porosity present in the material presumably allows the purification step to be effective. This material is porous and is not suitable for many applications due to this, including sustaining vacuum and uneven wear in etching chambers.

U.S. Pat. No. 3,960,577 describes a hot pressed β-phase SiC material made with 0.3-3.0% B-addition and 3.5-10% $Si_3N_4$ additions. The material is described as having nitrogen and B atoms accommodated in the SiC lattice which result in a conductive SiC material (resistivity of only 50 Ω·cm). Japanese Patent Application No. 11-210817 (Publication No. 2001-130971) (Bridgestone Corp.) application teaches a low electrical resistivity SiC (~1000 Ω·cm) material sintered using $Si_3N_4$ and free carbon precursor additions to the SiC starting powder (>65 wt % β-SiC). The resistivities in these inventions are very low and would not solve the problem this invention solves. U.S. Pat. Nos. 5,011,639 and 4,762,810 both describe a process for obtaining high resistivity SiC by pressureless sintering fine β-SiC powder obtained by pyrolysis of methyl hydrogen disilane, to which boron compounds such as $B_4C$, titanium boride and $B_2O_3$ are added, pressed and processed in a furnace with a source of nitrogen in the atmosphere. Japanese Patent Application No. 1986-61-100421 (Publication No. 62-256764) (Shin-Etsu) teaches a method for obtaining high resistivity SiC made by adding $B_2O_3$, BN or B and other metal oxides to β-SiC powder and pressureless sintering it on BN plates to densities over 3.09 g/cm³. All patents mentioned in this paragraph involve β-SiC materials and differ substantially from the present invention because of this. In addition to this difference they all involve different additives as compared to the present invention.

U.S. Pat. No. 4,135,938 (Carborundum) teaches a SiC with a resistivity of only ~1-10 Ω·cm made by sintering of α-SiC powders with the additions of BN, BP or $AlB_2$ (in the ~1 percent range) with simultaneous additions of 1-4% free carbon. Sintering was done between 2100 and 2200° C. in Ar. The findings in this invention are substantially different from the findings in patents described earlier with similar starting compositions, and the material has a low resistivity, which is not desirable.

SUMMARY OF THE INVENTION

An object of the present invention is to provide a ceramic material with high electrical volume resistivity that is free of metallic and metallic containing additions or sintering aids (such as BeO, $Al_2O_3$ and any others) as well as free carbon additions. The latter forms a separate phase in the final material. It is also an object hereof to provide a method to prepare a dense SiC body.

The present invention results from the unexpected discovery that a dense SiC material with high electrical resistivity (>1×10⁸ Ω·cm) can be made by hot pressing with the simultaneous additions of $B_4C$ (or BN), $Si_3N_4$ and $SiO_2$ to SiC (or by other pressure assisted method of densification) and can be obtained by employing the following steps:
 a) admixing and homogenizing fine and pure α-SiC powder with $B_4C$ (or other B compound) powder (about 0.3-7% range), $Si_3N_4$ powder (about 0.1-6% range) and $SiO_2$ powder (about 0.1-6% range)—(all of high purity);
 b) molding the powder mixture by pressing or by free loading into a die;
 c) heating the green body in a hot press die cavity in an inert gas atmosphere (Ar, He or similar) and using a hot press schedule with maximum temperatures from about 1950° C. to 2200° C. and pressure of from 1,000 psi (8.9 MPa) to 5,000 psi (34.5 MPa).

DETAILED DESCRIPTION OF THE DRAWINGS

Figure 2:
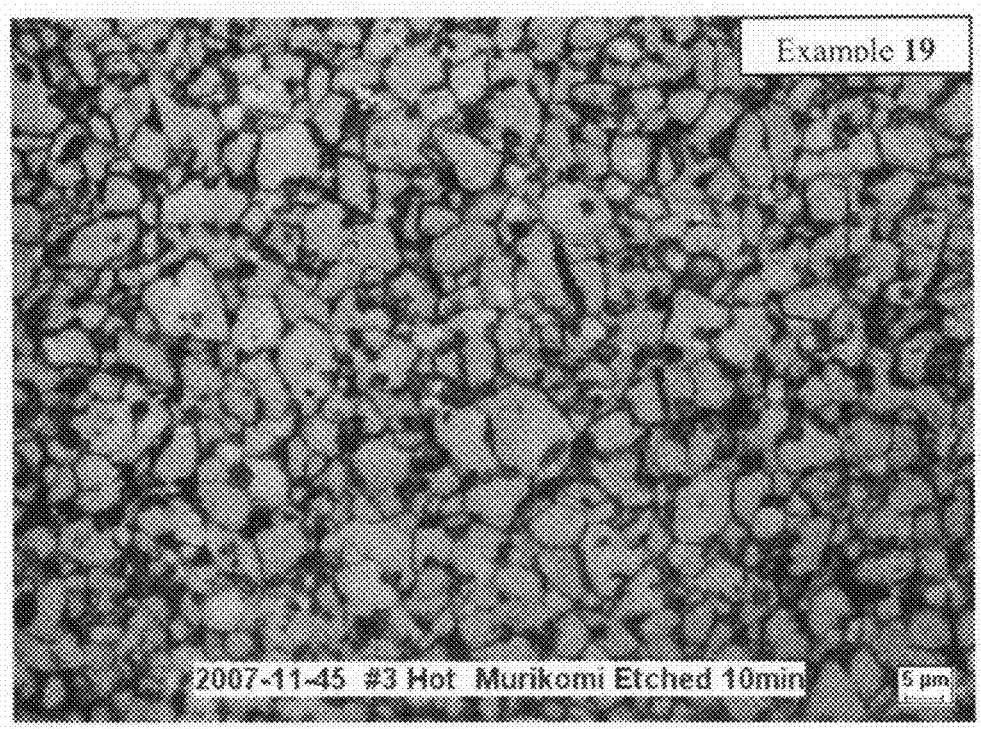

The aforementioned objects and advantages of the present invention, as well as additional objects and advantages thereof, will be more fully understood hereinafter as a result of a detailed description of preferred embodiments when taken in conjunction with the following drawings in which:

FIG. 1 is an optical micrograph of a Murikami etched example of SiC produced according to an embodiment hereof showing an elongated grain structure; and FIG. 2 is an optical microstructure presentation of a hot Murikami etched different example of the inventive SiC with fine equiaxed grains and no free carbon inclusions.

DETAILED DESCRIPTION OF PREFERRED EMBODIMENTS

It is well known that for pressureless sintered SiC it is necessary to add to fine SiC powder a small amount of boron containing compound (e.g. $B_4C$) and finely dispersed free carbon (usually 1-5%), and both of these need to be present to obtain high densities above 97% of theoretical value. The role of carbon in the process is thought to be reduction of silica always present on the surfaces of SiC powders (Equation 1) and thereby allow inter-diffusion and sintering to occur. This shows that $SiO_2$ is not an efficient sintering environment for SiC (2% addition when hot pressed at 2040° C. only reaches 53% Th. Density, p 143, Silicon Nitride Ceramics-2-ed. S. Somiya, Elsvier Applied Science, 1991).

$SiO_2+3C \rightarrow SiC+2CO\uparrow$        Equation 1

However, it is well known that residual free carbon in the finished parts is detrimental to the performance of the parts in some applications.

$Si_3N_4$ also is reported not to be a good sintering aid for SiC on its own, when 2% $Si_3N_4$ is added to SiC and hot pressed at 2040° C. (20 MPa), a density of only 60% of theoretical is obtained (p 143, Silicon Nitride Ceramics-2-ed. S. Somiya, Elsvier Applied Science, 1991).

Combinations of $Si_3N_4$ and $SiO_2$ as additions to α-SiC would not be expected to be effective densification aids either. However, this invention surprisingly has found that they are very effective when combined with $B_4C$ without the need for free carbon. This combination of sintering aids also provides high purity in the overall material as no metallic additions are made to the powder and their content can be controlled by the purity of the powders used and further processing.

Surprisingly, simultaneous additions of $B_4C$, $Si_3N_4$ and $SiO_2$ to α-SiC results in high resistivity SiC material, which is directly opposite to the findings of U.S. Pat. No. 3,960,577 where B and $Si_3N_4$ were added to β-SiC and low resistivity material was obtained.

The addition of $SiO_2$ serves two purposes. The first such purpose is to work as a sintering aid to help the densification. The second one is work as an agent to react with the free carbon and to remove other metallic impurities present in the raw powders (SiC, $B_4C$, etc.).

It is believed that several reactions occur during the heating above about 1600° C. of the SiC compacts with the sintering aids and allow the densification to occur and to create the final material that essentially consists of SiC with small amounts of $B_4C$, B, N and O either dissolved in the SiC or present as separate, small BN particles in the microstructure.

$Si_3N_4 \leftrightarrow 3Si+2N_2\uparrow$        Equation 2

$SiO_2+Si \rightarrow 2SiO\uparrow$        Equation 3

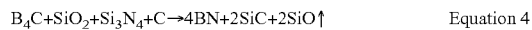

$B_4C+SiO_2+Si_3N_4+C \rightarrow 4BN+2SiC+2SiO\uparrow$        Equation 4

$Si_3N_4+SiO_2+2Si_2ON_2$        Equation 5

Depending on the starting ratio of additives to the SiC, and how the heating is performed, the final composition of the material is determined. Since the reactions 1-5 involve evolution of gases, these additives allow the material to be purified while it is being processed, and as long as the gaseous species can be carried out while the material is still not completely dense, the material can be densified and have a good purity as well. Equation 4 involves reactions with any free carbon that may be present in the raw materials, which is common.

Since SiC is a semi-conductive material with a band gap of about 3 eV and with an electrical conductivity which depends on the doping level of the lattice and the resulting concentration of n-type (holes) and p-type (electrons) and mobility in the band gap, the electrical resistivity of SiC of over $1\times10^8$ $\Omega\cdot cm$ can only be obtained if the electron donor and acceptor doping levels cancel each other resulting in high resistivity due to low concentration of charge carriers. It is known that nitrogen and aluminum doping of Si create n- and p-type defects respectively. Boron (above Al in the periodic table) would be analogous to Al (creating p-type defects). Therefore, this invention shows that if an $\alpha$-SiC lattice is simultaneously doped with B and N at about similar levels from within the material itself (not affected by the outside atmosphere), by adding interacting $Si_3N_4$, $B_4C$ and $SiO_2$ powders to $\alpha$-SiC powder, a high resistivity material will result.

Additionally, the reactions between the mixed powders at elevated temperatures result in a significant purification of the material as a whole, causing the impurities to be preferentially volatilized and removed, as will be seen in the examples discussed below.

For present invention in the preferred embodiment, the powder requirements are:

(1) $\alpha$-SiC powder is required with specific surface area above about 2 $m^2/g$, an average particle size of below about 5 $\mu m$, free carbon of less than 0.5% (preferably less than 0.3%), nitrogen content up to 1% and inevitable metallic impurity content (not including Si) of less than 2000 ppm, preferably less than 500 ppm.

(2) $Si_3N_4$ powder of specific surface area above about 6 $m^2/g$ and particle size below 2 $\mu m$, carbon content of about 0.5% (preferably below 0.3%), total metallic impurity level below about 1000 ppm (preferably below about 500 ppm).

(3) $SiO_2$ powder of specific surface area above 10 $m^2/g$, maximum particle size of above 5 $\mu m$, and with inevitable metal content of below 1000 ppm (preferably below 500 ppm).

(4) $B_4C$ powder of specific surface area above about 2 $m^2/g$ (preferably above about 4 $m^2/g$), particle size below about 10 $\mu m$ (preferably below about 5 $\mu m$), with O content less than about 1.5%, N about 0.4%, total C about 20-22%, and with inevitable metallic impurity content other than Si of less than about 10,000 ppm, (preferably less than about 5000 ppm).

In the first embodiment, the material of this invention with electrical volume resistivity of greater than about $1\times10^8$ $\Omega\cdot cm$ can be made by mixing the powders described above in a such way that their mixed composition is:

0.3-7% $B_4C$ powder
0.1-7% $Si_3N_4$ powder
0.1-6% $SiO_2$ powder
With the rest being SiC powder.

The powder mixture is preferably homogenized by ball milling in plastic jars with silicon nitride media (or other non-contaminating media, including coated media) in a solvent (this could be water or an organic solvent). Homogenizing could be done in alternate ways available in the art. Following mixing/milling, the powder is dried (by heating or by spray drying or in alternate ways), and optionally a binder can be added. After the powder has been obtained, it can be screened to remove large agglomerates, and is then loaded into a hot press die cavity of a predetermined size. The die is loaded into a hot press, which can be a vacuum or environmental hot press with protective atmosphere flow around the die and parts to prevent oxidation. The hot pressing is done preferably in Ar, but could also be done in other inert gases (He, Ne or $N_2$), at a temperature of about 2050 to 2200° C. and pressure between 1000 psi (8.9 MPa) and 5000 psi (34.5 MPa). During the heating of the load, a temperature hold between 1600° C. and 2000° C. is used to allow reactions between the powders to be completed and the gaseous species to be removed while the material is still porous.

The material produced in this way has a density of over 95% of theoretical (>3.0 $g/cm^3$) and a chemical composition about as follows:

0.3-4% B
0.1-6% N
0.06-0.5% O
28-30% C and remaining is Si (and inevitable impurities)

and has B and N distributed between the $B_4C$ and BN and the SiC grains. The materials contain no visible free carbon. Additionally, the atomic ratio of B/N in the materials is about 0.9 to 5. The total metal based impurity of the materials is about a factor of 3 lower than the incoming powders.

The final material has an electrical resistivity >$1\times10^8$ $\Omega\cdot cm$, and consists of predominantly $\alpha$-SiC (at least one or a mixture of 4H, 6H and 15R modifications) and possibly small amounts of BN.

In the current invention, it is found that, a minimum amount additive, especially $B_4C$ is useful to achieve densification even at high temperature. When the amount of additives is too high, the part also cannot be densified and the purity of the material may be compromised.

In the preferred embodiment, the material of this invention can be made by mixing the preferred powders described above to obtain better purity and so that their mixed composition is:

0.6-4% $B_4C$ powder
0.1-3% $Si_3N_4$ powder
0.1-3% $SiO_2$ powder
With the rest being SiC powder.

The powder mixture is homogenized in some way. This can be done by ball milling in plastic jars with silicon nitride (or other non-contaminating media, including coated media) in a solvent (this could be water or an organic solvent) and could be done in alternate ways available in the industry. Following sufficient mixing/milling, the powder is dried (by heating or by spray drying or in alternate ways), and optionally a binder can be added. After the powder has been obtained, it can be screened to remove large agglomerates, and is then loaded into a hot press die cavity of a predetermined size. The die is loaded into a hot press, which can be a vacuum or environmental hot press with protective atmosphere flow around the die and parts to prevent oxidation. The hot pressing is done preferably in Ar, but could also be done in other inert gases (He, Ne or $N_2$), and has a maximum temperature of 2050 to 2150° C. and pressure between 800 and 2500 psi. During the heating of the load, a temperature hold between 1800° C. and 1950° C. allows reactions between the powders to be completed and the gaseous species to be removed while the material is still porous.

In this preferred embodiment the material produced in this way has a density of over 97% of theoretical (~>3.1 $g/cm^3$) and a chemical composition about as follows:

0.3-2% B
0.2-3% N
0.06-0.3% O
28.5-30% C and remaining is Si (and inevitable impurities) and has B and N distributed between the $B_4C$ and BN and the SiC grains. The material contains no detectable free carbon. Additionally, the atomic ratio of B/N in the material is about 0.9 to about 1.4. The total metal based impurity of the materials is about a factor of 3 lower than the incoming powders, but since in this embodiment purer powder is used, the purity is higher.

The final material has an electrical resistivity $>1\times10^8$ Ω·cm, and consists of predominantly α-SiC (at least one or a mixture of 4H, 6H and 15R modifications) and possibly small amounts of BN.

EXAMPLES

In the following examples, density of the sintered samples was measured by Archimedes method using water as a media. Vickers hardness was measured according to ASTM C1327. Bending strength (4-point bending) was measured according to ASTM C1161 (B-size). Grain size measurements were done after polishing and etching using ASTM E112 (three concentric circle method). Etching was first attempted using plasma etching, followed by Murikami hot etch if required. Selected samples were analyzed for phase composition using powder X-ray diffraction (XRD) and phases were identified using Jade software. Chemical analysis was performed on selected samples to determine B (wet potentiometric method), C, N and O (inert gas fusion method for latter three elements) contents in the dense ceramics. Fracture toughness (Chevron notch) was measured at room temperature according to ASTM C1421. Volume electrical resistivity was measured according to ASTM D257 using guarded electrode method. Thermal conductivity was measured according to ASTM E1461 for measurement of thermal diffusivity, and thermal conductivity (λ) is derived using thermal diffusivity (α), specific heat capacity ($C_p$) and density (ρ) according to the relationship:

$$\lambda = \alpha \cdot C_p \cdot \rho$$

Examples 1-4

The powders used in the examples 1-4 have the following characteristics:
(1) α-SiC (hexagonal structure): surface area 4 $m^2/g$, mean particle size 1.6 μm, α-SiC content greater than 99.7%, impurities: C(free) (wt %)<0.14%, O(wt %)<0.25%, Fe<50 ppm, Al<60 ppm, B<3 ppm, Ni<20 ppm.
(2) β-SiC (cubic structure): surface area 5 $m^2/g$, mean particle size 1.7 μm, β-SiC content greater than 99.7%, total C=29.5-31%, impurities: O(wt %)<1.0%, Fe<10 ppm, Al<10 ppm, Ca<5 ppm, others<40 ppm.
(3) $SiO_2$: surface area 23 $m^2/g$, mean particle size 0.02-0.55 μm, $SiO_2$ content greater than 99.9%, impurity Na<300 ppm, Fe<5 ppm, Al<30 ppm and Mg<10 ppm.
(4) $B_4C$: surface area 2.5 $m^2/g$, mean particle size 2.5 μm, total (B+C)>97%, Total C>20.5%, Total B>76%, $B_2O_3$<1%, O<1.5%, Fe<0.3%, Si<0.5%, Al<0.25%, Ca<0.3%, B/C=3.8-4.1, N=0.2-1.0, others<0.1% (all weight %).
(5) $Si_3N_4$: surface area 10.5 $m^2/g$, mean particle size 0.5 μm, N (wt %)>38, O (wt %)<2.0, C (wt %)<0.2, Cl (ppm)<100, Fe(ppm)<100, Ca(ppm)<50, Al(ppm)<50, β/(α+β) (wt %)<5 and crystallinity (wt %)>99.

For each sample above, the powders (SiC, $Si_3N_4$, $B_4C$ and $SiO_2$) were weighed to give compositions according to Table 1, and were then ball milled in plastic jars with $Si_3N_4$ media in isopropyl alcohol (IPA) for 4 hours. The slurry was then dried to remove the IPA. Examples 1-3 are comparative examples and used β-SiC as a starting powder, whereas the Example 4, of this invention, used α-SiC powder.

TABLE 1

| | Composition (wt %) | | | | Hot Press | |
|---|---|---|---|---|---|---|
| Examples | SiC | $SiO_2$ | $Si_3N_4$ | $B_4C$ | Tempt (° C.) | Time (min) |
| 1* | 85 (β-SiC) | 5 | 5 | 5 | 2100 | 180 |
| 2* | 97 (β-SiC) | 1 | 1 | 1 | 2100 | 180 |
| 3* | 93 (β-SiC) | 2 | 2 | 3 | 2100 | 180 |
| 4 | 85 (α-SiC) | 5 | 5 | 5 | 2100 | 180 |

*comparative examples

The mixed/dried powders were loaded into a graphite die with BN coated graphite spacers that directly contact the parts. Hot pressing was then performed at 2100° C. for 3 hours under 1750 psi (12 MPa) and in flowing Ar gas with intermediate holds at 1700° C., 1800° C., 1900° C. and 2000° C. for 30-60 minutes. The hot pressed die was unloaded once cool and plates were separated, cleaned and inspected and the density and dimensions (typically ~10 cm×10 cm×1 cm) were measured.

Measured properties are listed in Table 2. It can be seen that examples 1-3 (comparative examples) provide electrical volume resistivities lower than can be measured on the equipment set up (<1×10$^8$ Ω·cm) and lower than desired in this invention. However, example #4, current invention, while α-SiC powder was employed, demonstrated high electrical volume resistivity.

TABLE 2

| | Properties | | |
|---|---|---|---|
| Examples | ρ(g/cm$^3$) | % TD | Rv (Ω·cm) |
| 1* | 3.077 | 98.80% | <1.0 × 10$^8$ |
| 2* | 3.072 | 99.30% | <1.0 × 10$^8$ |
| 3* | 3.078 | 98.30% | <1.0 × 10$^8$ |
| 4 | 3.133 | 100.90% | 2.1 × 10$^{10}$ |

*comparative examples

Examples 5-44

Compositions 5-44 were made using the same raw powders and same processing as Examples 1-4 (α-SiC powder was used in all these examples). Powders were batched according to Table 3 and prepared as described in examples 1-4. Powders were loaded into the hot press die as described in Example 1. Maximum temperature and holding times for each example is given in Table 3 and all had intermediate holds at 1700° C., 1800° C., 1900° C. and 2000° C. for 30-60 minutes. Measured properties, included densities, electrical resistivities, phase compositions (XRD), as well as thermal conductivity (on selected examples) and flexure strength and fracture toughness (on selected examples) are listed in Table 4.

The invention demonstrated that simultaneous additions of boron carbide, silicon oxide, and silicon nitride help to improve the electrical resistivity. Increasing the $B_4C$ addition, leads to further improvement of the insulating behavior. However, when the additions of silicon nitride, boron carbide and silica are over a certain amount (6% of each), even though the part can be densified, the electrical behavior degrades.

Here it can be seen that the addition of $SiO_2$ helps to "clean up" the materials. This is shown by comparisons of major metallic impurities of three samples 13, 14 and 41. The amount of impurity was measured by Glow-Discharge Mass Spectrometry (GDMS) in Table 5. Comparative sample 41 shows higher impurity content than samples made by the current invention.

Table 6 shows C, O, N, and B chemical analysis data of selected samples, including the B/N atomic ratio in the material. The B/N ratio in the current invention is in a tight range around 0.2-2.

TABLE 3

| | Composition (wt %) | | | | Hot Press | | |
|---|---|---|---|---|---|---|---|
| Examples | SiC | $SiO_2$ | $Si_3N_4$ | $B_4C$ | Tempt (° C.) | Time (min) | Pressure (psi) |
| 5 | 94 | 2 | 2 | 2 | 2100 | 90 | 1750 |
| 6 | 91 | 3 | 3 | 3 | 2100 | 90 | 1750 |
| 7 | 85 | 5 | 5 | 5 | 2100 | 90 | 1750 |
| 8 | 87 | 5 | 5 | 3 | 2100 | 90 | 1750 |
| 9 | 97 | 1 | 1 | 1 | 2050 | 150 | 1750 |
| 10 | 96 | 1 | 1 | 2 | 2050 | 150 | 1750 |
| 11 | 93 | 2 | 2 | 3 | 2050 | 150 | 1750 |
| 12 | 82 | 6 | 6 | 6 | 2050 | 150 | 1750 |
| 13 | 97 | 1 | 1 | 1 | 2100 | 180 | 1750 |

TABLE 3-continued

| | Composition (wt %) | | | | Hot Press | | |
|---|---|---|---|---|---|---|---|
| Examples | SiC | $SiO_2$ | $Si_3N_4$ | $B_4C$ | Tempt (° C.) | Time (min) | Pressure (psi) |
| 14 | 96 | 1 | 1 | 2 | 2100 | 180 | 1750 |
| 15 | 93 | 2 | 2 | 3 | 2100 | 180 | 1750 |
| 16 | 82 | 6 | 6 | 6 | 2100 | 180 | 1750 |
| 17 | 94 | 2 | 2 | 2 | 2050 | 150 | 1750 |
| 18 | 91 | 3 | 3 | 3 | 2050 | 150 | 1750 |
| 19 | 85 | 5 | 5 | 5 | 2050 | 150 | 1750 |
| 20 | 87 | 5 | 5 | 3 | 2050 | 150 | 1750 |
| 21 | 98.5 | 0.5 | 0.5 | 0.5 | 2100 | 180 | 1750 |
| 22 | 97 | 1 | 1 | 1 | 2100 | 180 | 1750 |
| 23 | 93 | 2 | 2 | 3 | 2100 | 180 | 1750 |
| 24 | 82 | 6 | 6 | 6 | 2100 | 180 | 1750 |
| 25 | 98.5 | 0.5 | 0.5 | 0.5 | 2050 | 180 | 1750 |
| 26 | 97 | 1 | 1 | 1 | 2050 | 180 | 1750 |
| 27 | 93 | 2 | 2 | 3 | 2050 | 180 | 1750 |
| 28 | 82 | 6 | 6 | 6 | 2050 | 180 | 1750 |
| 29 | 98.5 | 0.5 | 0.5 | 0.5 | 2130 | 150 | 1500 |
| 30 | 97 | 1 | 1 | 1 | 2130 | 150 | 1500 |
| 31 | 93 | 2 | 2 | 3 | 2130 | 150 | 1500 |
| 32 | 82 | 6 | 6 | 6 | 2130 | 150 | 1500 |
| 33 | 96 | 2 | 0 | 2 | 2100 | 180 | 1500 |
| 34* | 96 | 0 | 2 | 2 | 2100 | 180 | 1500 |
| 35 | 96 | 2 | 2 | 0 | 2100 | 180 | 1500 |
| 36 | 83 | 8 | 8 | 1 | 2100 | 180 | 1500 |
| 37 | 94 | 2 | 2 | 2 | 2000 | 100 | 1750 |
| 38 | 91 | 3 | 3 | 3 | 2000 | 100 | 1750 |
| 39 | 85 | 5 | 5 | 5 | 2000 | 100 | 1750 |
| 40 | 87 | 5 | 5 | 3 | 2000 | 100 | 1750 |
| 41* | 88 | 0 | 6 | 6 | 2130 | 180 | 1500 |
| 42* | 94 | 0 | 3 | 3 | 2130 | 180 | 1500 |
| 43 | 92 | 2 | 2 | 4 | 2130 | 180 | 1500 |
| 44 | 92 | 2 | 4 | 2 | 2130 | 180 | 1500 |

*Comparative examples

TABLE 4

| | Properties | | | | | | |
|---|---|---|---|---|---|---|---|
| Examples | $\rho(g/cm^3)$ | % TD | Rv ($\Omega \cdot cm$) | Grain morphology | Mean grain intercept (μm) | HV0.3 ($kg/mm^2$) | Phase composition (XRD) |
| 5 | 3.188 | 100.7% | $1.5 \times 10^9$ | Elongated* | 4.0 | 3116 | 4H + 6H-SiC |
| 6 | 3.171 | 100.8% | $1.2 \times 10^{12}$ | Elongated | 5.1 | 3068 | 4H + 6H-SiC + BN (h) |
| 7 | 3.133 | 100.9% | $2.3 \times 10^{12}$ | Elongated | 5.8 | 2953 | 4H + 6H-SiC + BN(h) |
| 8 | 3.175 | 101.7% | $4.3 \times 10^9$ | Elongated | 5.2 | 3074 | 4H + 6H-SiC |
| 9 | 3.162 | 99.2% | $4.7 \times 10^{10}$ | Equiaxed | 3.1 | 3050 | 4H + 6H-SiC |
| 10 | 3.145 | 98.9% | $2.3 \times 10^{10}$ | Equiaxed | 3.0 | 3080 | 4H + 6H-SiC |
| 11 | 2.866 | 90.7% | $1.4 \times 10^{11}$ | Equiaxed | 2.9 | 3020 | 4H + 6H-SiC |
| 12 | 3.032 | 98.3% | $2.5 \times 10^{10}$ | Equiaxed | 3.1 | 2910 | 4H + 6H-SiC + BN(h) |
| 13 | 3.194 | 100.2% | $2.4 \times 10^{10}$ | Elongated | 11.0 | 3040 | 4H + 6H + 15R-SiC |
| 14 | 3.180 | 100.0% | $2.2 \times 10^9$ | Elongated | 11.6 | 3030 | 4H + 6H + 15R-SiC |
| 15 | 3.055 | 96.7% | $1.5 \times 10^{12}$ | Equiaxed | 5.6 | 3050 | 6H + 15R-SiC + BN(h) |
| 16 | 3.103 | 100.6% | $1.1 \times 10^{12}$ | Equiaxed | 5.5 | 2960 | 6H + 15R-SiC + BN(h) |
| 17 | 3.133 | 98.9% | $3.2 \times 10^{11}$ | equiaxed | 2.9 | 3050 | 4H + 6H + 15R-SiC |
| 18 | 3.101 | 98.6% | $3.6 \times 10^{11}$ | equiaxed | 3.1 | 3050 | 4H + 6H + 15R-SiC + BN |
| 19 | 3.018 | 97.2% | $1.7 \times 10^{11}$ | equiaxed | 3.2 | 2980 | 4H + 6H + 15R-SiC + BN |
| 20 | 3.101 | 99.4% | na | equiaxed | 3.1 | 2900 | 4H + 6H + 15R-SiC + BN |
| 21 | 3.009 | 94.1% | $<1.0 \times 10^8$ | Elongated | 5.0 | 3080 | 4H + 6H-SiC |
| 22 | 3.102 | 97.3% | $4.2 \times 10^8$ | Elongated | 5.6 | 3100 | 4H + 6H-SiC + BN (h) |
| 23 | 3.173 | 100.5% | $1.9 \times 10^{11}$ | Elongated | 5.5 | 3050 | 4H + 6H-SiC + BN (h) |
| 24 | 3.084 | 100.0% | $2.3 \times 10^9$ | Elongated | 5.2 | 2960 | 4H + 6H-SiC + BN (h) |
| 25 | 2.629 | 82.2% | $<1.0 \times 10^8$ | equiaxed | 3.2 | 2600 | 4H + 6H + 15R-SiC |
| 26 | 2.669 | 83.7% | $<1.0 \times 10^8$ | equiaxed | 3.1 | 2500 | 4H + 6H + 15R-SiC |
| 27 | 3.130 | 99.1% | $2.0 \times 10^{10}$ | equiaxed | 2.9 | 3050 | 4H + 6H + 15RSiC + BN |
| 28 | 3.053 | 99.0% | $1.7 \times 10^9$ | equiaxed | 3.2 | 2955 | 4H + 6H + 15R-SiC + BN |
| 29 | 3.056 | 95.5% | $2 \times 10^{13}$ | Elongated | 7 | 3050 | 4H + 6H + 15R-SiC |

TABLE 4-continued

| Examples | $\rho$(g/cm$^3$) | % TD | Rv ($\Omega \cdot$ cm) | Grain morphology | Mean grain intercept ($\mu$m) | HV0.3 (kg/mm$^2$) | Phase composition (XRD) |
|---|---|---|---|---|---|---|---|
| 30 | 3.107 | 97.5% | $3.1 \times 10^{10}$ | Elongated | 10 | 3060 | 4H + 6H + 15R-SiC |
| 31 | 3.170 | 100.4% | $1.0 \times 10^{8}$ | Elongated | 8.5 | 3020 | 4H + 6H + 15RSiC + BN |
| 32 | 3.094 | 100.3% | $8.3 \times 10^{9}$ | Elongated | 9 | 2930 | 4H + 6H + 15R-SiC + BN |
| 33 | 3.177 | 100.3% | $1.4 \times 10^{10}$ | Elongated | 6.1 | 3000 | 4H + 6H + 15R-SiC |
| 34 | 3.086 | 96.7% | $6.8 \times 10^{9}$ | Elongated | 5.5 | 3010 | 4H + 6H + 15R-SiC |
| 35 | 2.305 | 72.4% | $<1.0 \times 10^{8}$ | Elongated | 6 | 3030 | 4H + 6H + 15R-SiC |
| 36 | 2.902 | 93.5% | $<1.0 \times 10^{8}$ | Elongated | 5 | 2900 | 4H + 6H + 15R-SiC |
| 37 | 2.923 | 92.3% | $4.5 \times 10^{10}$ | equiaxed | 2.5 | 3000 | 4H + 6H + 15R |
| 38 | 2.858 | 90.9% | $6.8 \times 10^{10}$ | equiaxed | 2.8 | 2980 | 4H + 6H + 15R |
| 39 | 2.733 | 88.1% | $6.8 \times 10^{10}$ | equiaxed | 2.8 | 2910 | 4H + 6H + 15RSiC + BN |
| 40 | 2.871 | 92.0% | $1.7 \times 10^{10}$ | equiaxed | 2.9 | 2920 | 4H + 6H + 15RSiC + BN |
| 41 | 3.117 | 98.8% | $2.7 \times 10^{11}$ | equiaxed | 10 | 2900 | 4H + 6H + 15RSiC + BN |
| 42 | 3.161 | 99.3% | $7.5 \times 10^{10}$ | equiaxed | 11 | 3000 | 4H + 6H + 15R |
| 43 | 3.098 | 98.3% | $1.5 \times 10^{12}$ | equiaxed | 9 | 2950 | 4H + 6H + 15R |
| 44 | 3.150 | 99.5% | $2.4 \times 10^{10}$ | equiaxed | 9 | 2920 | 4H + 6H + 15R |

*elongated grains 5-10 $\mu$m in diameter (or platelet intersections), 50-150 $\mu$m long.

TABLE 5

| | Properties | | | |
|---|---|---|---|---|
| Examples | $\lambda$ (W/m · K) | Strength (MPa) | $K_{IC}$ (MPa · m$^{1/2}$) | Metallic Impurity content (GDMS) |
| 9 | 105.4 | | | |
| 10 | 88.7 | | | |
| 11 | 109.3 | | | |
| 12 | 92.7 | | | |
| 13 | 93 | | | 470 ppm |
| 14 | 89 | 355 | 3.05 | |
| 15 | 89 | | | |
| 16 | 90 | | | 455 ppm |
| 23 | | 454 | 2.85 | |
| 24 | | 398 | 3.01 | |
| 25 | | | | |
| 26 | 83 | | | |
| 41 | | | | 700 ppm |

Another important feature of this invention is, compared to SiC sintered with additions of B compounds and fine carbon or other additives, which are readily etched using a plasma etching apparatus, samples 4-44 showed a resistance to plasma etching in fluorocarbon-oxygen environment. Hot Murikami etchant was then required to etch the samples. Since this composition is primarily to be used in plasma etching chambers, this is clearly a big advantage.

TABLE 6

| | Chemical Analysis (wt %) | | | | |
|---|---|---|---|---|---|
| Examples | B | C | N | O | B/N atomic ratio |
| 5 | 0.65 | 29.17 | 0.813 | 0.393 | 1.04 |
| 13 | 0.35 | 29.47 | 0.387 | 0.160 | 1.17 |
| 15 | 1.39 | 28.80 | 1.700 | 0.110 | 1.06 |
| 22 | 0.75 | 29.44 | 0.853 | 0.077 | 1.14 |
| 32 | 2.90 | 27.71 | 4.063 | 0.088 | 0.92 |
| 33 | 1.03 | 29.17 | 0.988 | 0.062 | 1.35 |
| 34* | 1.30 | 28.85 | 1.630 | 0.063 | 1.03 |
| 35 | 0.16 | 29.68 | 1.070 | 0.160 | 0.19 |
| 36 | 0.77 | 29.13 | 0.893 | 0.079 | 1.12 |
| 41* | 3.72 | 27.78 | 3.327 | 0.067 | 1.45 |

*Comparative examples

Having thus disclosed numerous exemplary embodiments of the invention herein, it will now be readily apparent that the particular starting powder, fabrication process and resulting constituents of the ceramic material described herein may be modified. Moreover, such modifications, while possibly deviating from the disclosed embodiments, would still exhibit the principal features hereof that are believed to make the invention novel and unobvious. Therefore, the scope hereof is to be deemed to be limited only by the appended claims and not by the specific examples disclosed herein.

We claim:

1. Hot pressed SiC ceramic material having a density of at least 97% of the theoretical density and an electrical volume resistivity no less than $1 \times 10^8$ $\Omega$·cm at 25° C., and consisting essentially of
   (1) at least 90% by weight of alpha silicon carbide;
   (2) about 0.3 to 4.0% by weight of boron;
   (3) about 0.2 to 6.0% by weight of nitrogen;
   (4) 0.06% to 0.5% by weight of oxygen;
   (5) and having a B/N atomic ratio from about 0.3 to about 2.0.

2. The ceramic material of claim 1 wherein the boron and nitrogen are present according to an B/N atomic ratio of 0.9 to 1.5.

3. The ceramic material of claim 1 having either elongated grain structure or fine equiaxed grain structure, predominantly $\alpha$-SiC with at least one or a mixture of 4H, 6H and 15R modifications.

4. The ceramic material of claim 1, wherein the boron and nitrogen are present in solid solution with the SiC as a SiC—BN mixed crystal and being present as a secondary phase which is selected from the group consisting of hexagonal boron nitride, other crystalline or amorphous phases of the Si—B—C—N—O system, and mixtures of BN with other crystalline or amorphous phases of the Si—B—C—N—O system; the secondary phase being present mainly at an interface to the SiC phase or the SiC—BN solid solution phase.

5. The ceramic material of claim 1 having no more than 0.07% by weight of all foreign metallic impurities, the said metal impurities being the sum of all metal impurities except Si, when analyzed by glow discharge mass spectrometry or similar method.

6. The ceramic material of claim 1, wherein density is at least 98% of theoretical density.

7. The ceramic material of claim 1, wherein the Vickers hardness is at least 2500 Kg/mm$^2$.

8. A process for fabricating the ceramic material of claim 1, comprising hot pressing at 1950° C. to 2200° C., at a pressure of 1000 psi to 5000 psi in an inert gas.

9. The ceramic material of claim 1 formed as an insulating component for semiconductor and integrated circuit fabrication.

10. The ceramic material of claim 1 formed as a component of an electrostatic chuck for fixture of wafers in semiconductor fabrication.

11. The ceramic material of claim 1 formed as a structural part of a plasma etching chamber.

12. The ceramic material of claim 1 formed as structural part of gas seal rings.

13. The ceramic material of claim 1 formed as an armor plate to prevent penetration of bullets.

14. A dense hot pressed electrically insulating SiC ceramic material made from a powder mix consisting of, by weight, from 0.1 to 7% boron carbide, from 0.1 to 7% silicon nitride, from 0.1 to 6% silicon dioxide, and a balance of alpha silicon carbide, said hot pressed SiC material having a density close to the theoretical density and an electrical volume resistivity no less than $1 \times 10^8$ Ω·cm at 25° C., and consisting essentially of:
  (i) at least 90% by weight of alpha silicon carbide;
  (ii) about 0.3 to 4.0% by weight of boron;
  (iii) about 0.2 to 6.0% by weight of nitrogen;
  (iv) 0.06% to 0.5% by weight of oxygen;
  (v) and having a B/N atomic ratio from about 0.3 to about 2.0.

* * * * *